US008018197B2

(12) United States Patent
Nascimento

(10) Patent No.: US 8,018,197 B2
(45) Date of Patent: Sep. 13, 2011

(54) VOLTAGE REFERENCE DEVICE AND METHODS THEREOF

(75) Inventor: Ivan Carlos Ribeiro Nascimento, Campinas (BR)

(73) Assignee: Freescale Semiconductor, Inc., Austin, TX (US)

( * ) Notice: Subject to any disclaimer, the term of this patent is extended or adjusted under 35 U.S.C. 154(b) by 696 days.

(21) Appl. No.: 12/141,423

(22) Filed: Jun. 18, 2008

(65) Prior Publication Data

US 2009/0315525 A1 Dec. 24, 2009

(51) Int. Cl.
*H01M 10/44* (2006.01)
*H01M 10/46* (2006.01)

(52) U.S. Cl. ........................................................ 320/116

(58) Field of Classification Search .................. 320/107, 320/116, 117; 323/315, 316, 317, 907; 365/211
See application file for complete search history.

(56) References Cited

U.S. PATENT DOCUMENTS

| | | | | |
|---|---|---|---|---|
| 5,666,046 | A * | 9/1997 | Mietus | 323/313 |
| 7,057,958 | B2 * | 6/2006 | So et al. | 365/211 |
| 2004/0263144 | A1 | 12/2004 | Tseng et al. | |
| 2005/0078537 | A1 * | 4/2005 | So et al. | 365/211 |
| 2005/0093530 | A1 | 5/2005 | Lee | |
| 2005/0127987 | A1 | 6/2005 | Sato et al. | |
| 2005/0134365 | A1 | 6/2005 | Kimura | |
| 2005/0140428 | A1 | 6/2005 | Tran et al. | |

OTHER PUBLICATIONS

I.M. Filanovsky, Mutual Compensation of Mobility and Threshold Voltage Temperature Effects with Applications in CMOS Circuits, IEEE Transactions on Circuits and Systems—I: Fundamental Theory and Applications, vol. 48, No. 7, Jul. 2001, pp. 876-884.

* cited by examiner

*Primary Examiner* — Edward Tso

(57) ABSTRACT

A voltage reference module of an integrated circuit device includes a current source to apply a current to a set of voltage cells, thereby generating a voltage drop across each cell. The voltage cells are configured such that the individual voltage drop associated with each cell in response to the application of the current is relatively stable over a temperature range. The voltage reference module generates a voltage based on the voltage drops across the voltage cells, and therefore the generated voltage is also stable over the temperature range. Bypass switches can be connected across each voltage cell whereby the switches can be individually opened and closed to include or exclude cells in generation of the reference voltage. In an embodiment, the switches are set during a trimming process for the integrated circuit device so that the voltage reference module provides a specified voltage.

20 Claims, 5 Drawing Sheets

VOLTAGE REFERENCE DEVICE AND METHODS THEREOF

FIELD OF THE DISCLOSURE

The present disclosure relates to integrated circuit devices, and more particularly to generating a reference voltage for an integrated circuit device.

BACKGROUND

Integrated circuits sometimes employ a voltage reference module to generate a stable voltage for a functional module of the integrated circuit. It is typically desirable that the voltage reference module provide a voltage that is stable over an expected range of operating temperature for the integrated circuit. An example of a voltage reference module capable of generating a stable voltage is a bandgap voltage reference. The bandgap reference uses a voltage difference between two diodes to produce a stable current, and in turn applies the current to a resistor to generate the stable voltage. However, the amount of current required by the bandgap reference is undesirable for low-power integrated circuit devices. Accordingly a new voltage reference module would be useful.

DETAILED DESCRIPTION

A voltage reference module of an integrated circuit device includes a current source to apply a current to a set of voltage cells, thereby generating a voltage drop across each cell. The voltage cells are configured such that the individual voltage drop associated with each cell in response to the application of the current is relatively stable over a specified temperature range. The voltage reference module generates a voltage based on the voltage drops across the voltage cells, and therefore the generated voltage is also stable over the specified temperature range. Bypass switches can be connected across each voltage cell whereby the switches can be individually opened and closed to include or exclude cells in generation of the reference voltage. In an embodiment, the switches are set during a trimming process for the integrated circuit device so that the voltage reference module provides a specified voltage.

Figure 1:
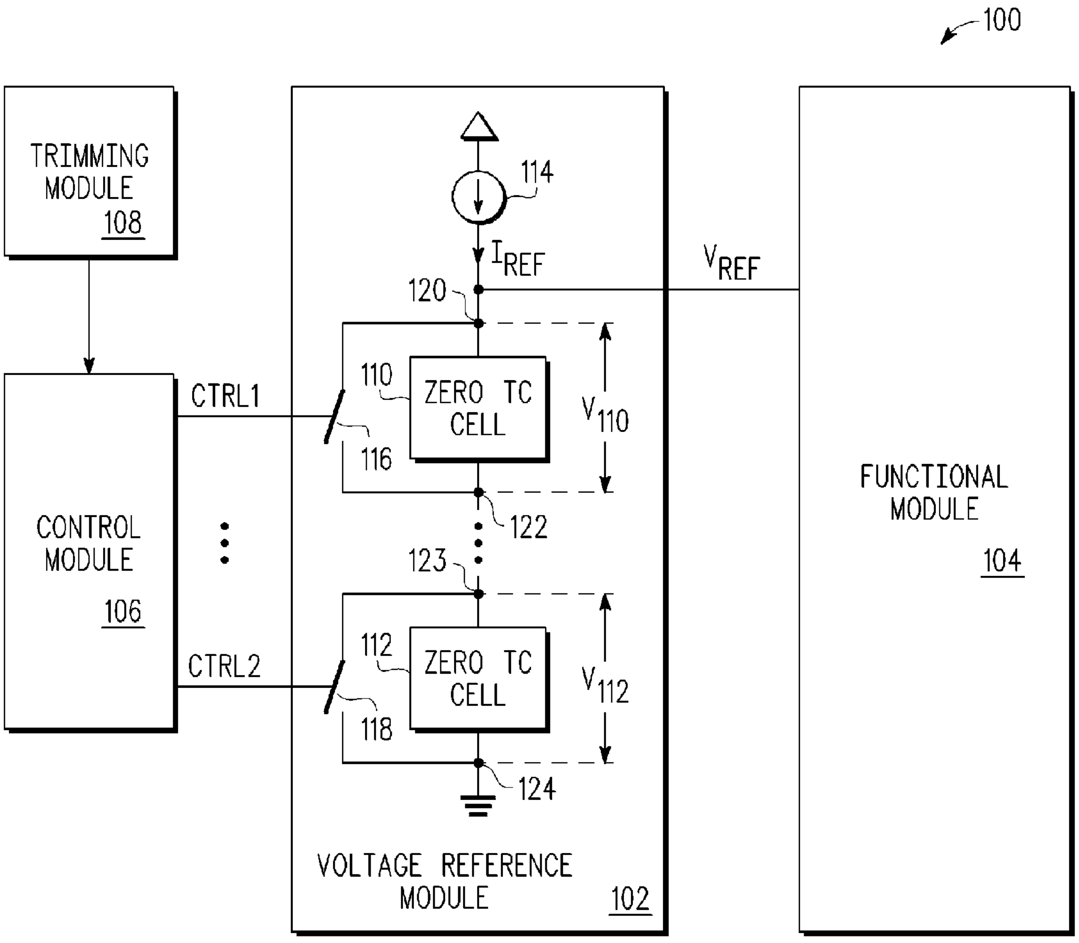
FIG. 1 illustrates a block diagram of an integrated circuit in accordance with one embodiment of the present disclosure.

FIG. 1 illustrates a particular embodiment of a block diagram of an integrated circuit device 100 including a voltage reference module 102, a functional module 104, a control module 106, and a trimming module 108. The voltage reference module 102 includes a inputs to receive a set of control signals, including an input to receive a signal labeled CTRL1 and an input to receive a control signal labeled CTRL2. The voltage reference module 102 also includes an output to provide a voltage labeled $V_{REF}$. The functional module 104 has an input terminal to receive the voltage $V_{REF}$. The control module 106 has an input, and outputs to provide the set of control signals including outputs to provide the control signals CTRL1 and CTRL2. The trimming module 108 has an output connected to the input of the control module 106.

The voltage reference module 102 includes a plurality of voltage cells, including voltage cells referred to as zero temperature coefficient (ZTC) cells. Two ZTC cells, referred to as ZTC cell 110 and ZTC cell 112, are specifically illustrated at FIG. 1. The voltage reference module 102 also includes a current source 114, and switches 116 and 118. The current source 114 has a first terminal connected to a first reference voltage and a second terminal connected to a node 120. The ZTC cell 110 has a first terminal connected to the node 120, and a second terminal connected to a node 122. The ZTC cell 112 has a first terminal connected to the node 122, and a second terminal connected to a node 124. The switch 116 has a first terminal connected to the first terminal of the ZTC cell 110, a second terminal connected to the second terminal of the ZTC cell 110, and a control input configured to receive the control signal CTRL1. The switch 118 has a first terminal connected to the first terminal of the ZTC cell 112, a second terminal connected to the second terminal of the ZTC cell 112, and a control input configured to receive the control signal CTRL2. The node 120 is connected to the output of the voltage reference module 102, and the node 120 is connected to a second reference voltage.

The functional module 104 is a functional module of the integrated circuit device 100 that includes digital logic, analog elements, memory elements and the like, or any combination thereof configured to perform a specified function. The functional module 104 can include a voltage regulator, a power on reset module, a voltage monitor, a voltage to current converter, and the like. The functional module 104 receives the voltage, $V_{REF}$, and uses the voltage as a reference voltage to perform the specified function.

The trimming module 108 is configured to provide trimming information configured to set the voltage $V_{REF}$ to a specified level. In particular, the trimming module 108 may include a storage module that includes trimming information. The storage module can be a set of fuses, a read-only memory, or any other module configured to store trimming information. The trimming information can be adjusted during an automatic or user-controlled trimming process of the integrated circuit 100 in order to adjust a nominal level of the voltage $V_{REF}$ to the specified level. As used herein, a voltage is set to a specified level when it is set to the specified level within a specified tolerance.

The control module 106 receives trimming information at the input and provides control signals CTRL1 and CTRL2 based on the received trimming information. The control signals are configured to adjust the voltage $V_{REF}$ to a specified level based on the trimming information.

The voltage reference module 102 is configured to generate the reference voltage $V_{REF}$ based on the set of control signals including control signals CTRL1 and CTRL2. In particular, the current source 114 generates a current, labeled $I_{REF}$, and applies it to the ZTC cells 110 and 112 to provide a reference voltage, $V_{REF}$. As used herein, a zero temperature coefficient (ZTC) cell refers to a cell that provides a substantially constant voltage drop across the cell over a specified temperature range in response to an application of a current. In the illustrated embodiment of FIG. 1, the specified temperature range corresponds to an expected range of operating temperatures for the integrated circuit 100. In one embodiment, ZTC cells 110 and 112 are configured to provide a voltage drop that varies less than 15 percent over a temperature range of −40° C. to 150° C., and thereby provide a substantially constant voltage drop. In another embodiment, the ZTC cells 110 and 112 are configured to provide a voltage drop of less than 5 percent over the temperature range of −40° C. to 150° C., and thereby provide a substantially constant voltage drop. The reference voltage, $V_{REF}$, generated by the voltage reference module 102 is equal to the sum of voltage drops generated in response to the current $I_{REF}$ across the ZTC cells of the voltage reference module. In an embodiment, the current $I_{REF}$ is a relatively low current compared to currents required by a conventional bandgap voltage reference. For example, in one embodiment the current $I_{REF}$ is approximately 0.5 micro-amps. In another embodiment, the current $I_{REF}$ is approximately 100 nano-amps.

The switches 116 and 118 are configured to be controlled by the control signals CTRL1 and CTRL2 to set a level of the voltage $V_{REF}$ by controlling application of the current $I_{REF}$ to the ZTC cells 110 and 112. For example, if the control signal CTRL1 is set so that the switch 116 is closed, the current $I_{REF}$ bypasses the ZTC cell 110 and the voltage drop across ZTC cell 110, represented by the voltage $V_{110}$, is substantially equal to zero. However, if the control signal CTRL1 is set so that switch 116 is opened, the current $I_{REF}$ is applied to the ZTC cell 110 and the voltage $V_{110}$ is set to a nominal level based on the configuration of the components that make up ZTC cell 110. Similarly, if the switch 118 is closed, the voltage drop across ZTC cell 112, labeled $V_{112}$, is substantially equal to zero. If the switch 118 is opened, the current $I_{REF}$ is applied to the ZTC cell 112, causing the voltage $V_{112}$ to be set at a magnitude that is set to a nominal level based on the configuration of the components that make up ZTC cell 110. Thus, the voltage reference module 102 generates the reference voltage, $V_{REF}$, based on the combination of the voltages $V_{110}$ and $V_{112}$, that is stable over the expected range of operating temperatures for the integrated circuit 100.

In operation, the voltage reference module 102 can be trimmed to adjust for process and operating conditions of the integrated circuit 100 so that the reference voltage $V_{REF}$ is set to a specified level. For example, process variations in forming the resistors and transistors associated with the ZTC cells 110 and 112 can cause the actual voltage provided by of the ZTC cells 110 and 112 to vary from specified levels, thus causing a deviation in $V_{REF}$ from a specified level. During a trimming process for the integrated circuit 100, the voltage $V_{REF}$ can be measured. If the measured level of $V_{REF}$ varies from a specified level, the trimming information at the trimming module 108 can be adjusted to set the state of the switches 116 and 118, thereby controlling application of the current $I_{REF}$ to the ZTC cells 110 and 112 so that $V_{REF}$ is set to the specified level.

For example, during testing or qualification of the integrated circuit device 100, the switches 116 and 118 can be placed in an initial state such that switch 116 is closed and switch 118 is open. The voltage $V_{REF}$ is measured with the switches 116 and 118 in the initial state and, if the voltage is below a specified level, the switch 116 is opened, thereby increasing $V_{REF}$. Trimming information indicating configuration of the switch states that result in $V_{REF}$ being placed at the specified level is stored at the trimming module 108. In response to a power-on reset event at the integrated circuit device 100, the control module sets the state of the switches 116 and 118 based on the stored trimming information, thereby setting the voltage $V_{REF}$ to the specified level. Thus, the illustrated voltage reference module 102 is able to generate a voltage within a specified tolerance while consuming a relatively small amount of current.

Figure 2:
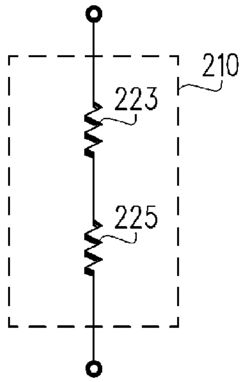
FIG. 2 illustrates a circuit diagram of a particular embodiment of a zero temperature coefficient cell of FIG. 1.

FIG. 2 illustrates a circuit diagram of a particular embodiment of a ZTC cell 210, corresponding to the ZTC cell 110 of FIG. 1. The ZTC cell 210 includes a resistor 223 and a resistor 225. The resistor 223 has a first terminal and a second terminal. The resistor 225 has a first terminal connected to the second terminal of the resistor 225 and a second terminal. The resistor 223 is formed such that it has a positive temperature coefficient, so that its resistance varies in direct proportion to the temperature of the integrated circuit device 100. The resistor 225 is formed such that it has a negative temperature coefficient, so that its resistance varies in inverse proportion to the temperature of the integrated circuit device 100. Thus, as the temperature of the integrated circuit 100 changes, alterations in the resistance of the resistor 223 resulting from the temperature change are approximately matched by inverse alterations in the resistance of the resistor 225, such that the combined resistance of the resistors is substantially constant over a specified range of operating temperatures of the integrated circuit 100.

In an embodiment, the complementary temperature relationships of the resistors 223 and 225 are created based on the process used to form each resistor. For example, in one embodiment, the resistor 223 is a diffused resistor and the resistor 225 is a polysilicon resistor. It will be appreciated that other materials and processes can be used to form the resistors. It will further be appreciated that, in other embodiments, the resistor 223 can have a negative temperature coefficient and the resistor 225 have a positive temperature coefficient.

Because the resistors 223 and 225 in combination have a substantially constant resistance over a specified range of temperatures, the ZTC cell 210 will have a substantially constant voltage drop across its terminals in response to application of a current at the terminals. In an embodiment, a voltage drop across the ZTC cell 210 is approximately 115 millivolts in response to application of a 0.5 micro-amp current at the cell. The voltage drop varies less than 3.7 percent over a temperature range of −40° C. to +150° C. and the voltage drop therefore is substantially constant over this range.

Figure 3:
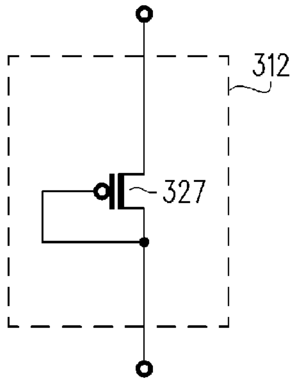
FIG. 3 illustrates a circuit diagram of an alternative embodiment of a zero temperature coefficient cell of FIG. 1.

FIG. 3 illustrates a circuit diagram of a particular embodiment of a ZTC cell 312, corresponding to ZTC cell 112 of FIG. 1. The ZTC cell 312 includes a p-channel transistor 327 having a drain current electrode, a source current electrode, and a control electrode connected to the source current electrode. In response to application of a current at the drain current electrode, the transistor 327 provides a substantially constant voltage drop over a specified range of temperatures.

Figure 4:
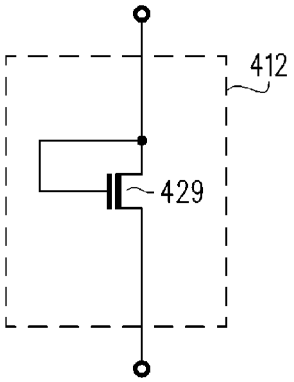
FIG. 4 illustrates a circuit diagram of another particular embodiment of a zero temperature coefficient cell of FIG. 1.

FIG. 4 illustrates a circuit diagram of a particular embodiment of a ZTC cell 412, corresponding to ZTC cell 112 of FIG. 1. The ZTC cell 412 includes an n-channel transistor 429 having a source current electrode, a drain current electrode, and a control electrode connected to the drain current electrode. In response to application of a current at the drain current electrode, the transistor 429 provides a substantially constant voltage drop over a specified range of temperatures.

Figure 5:
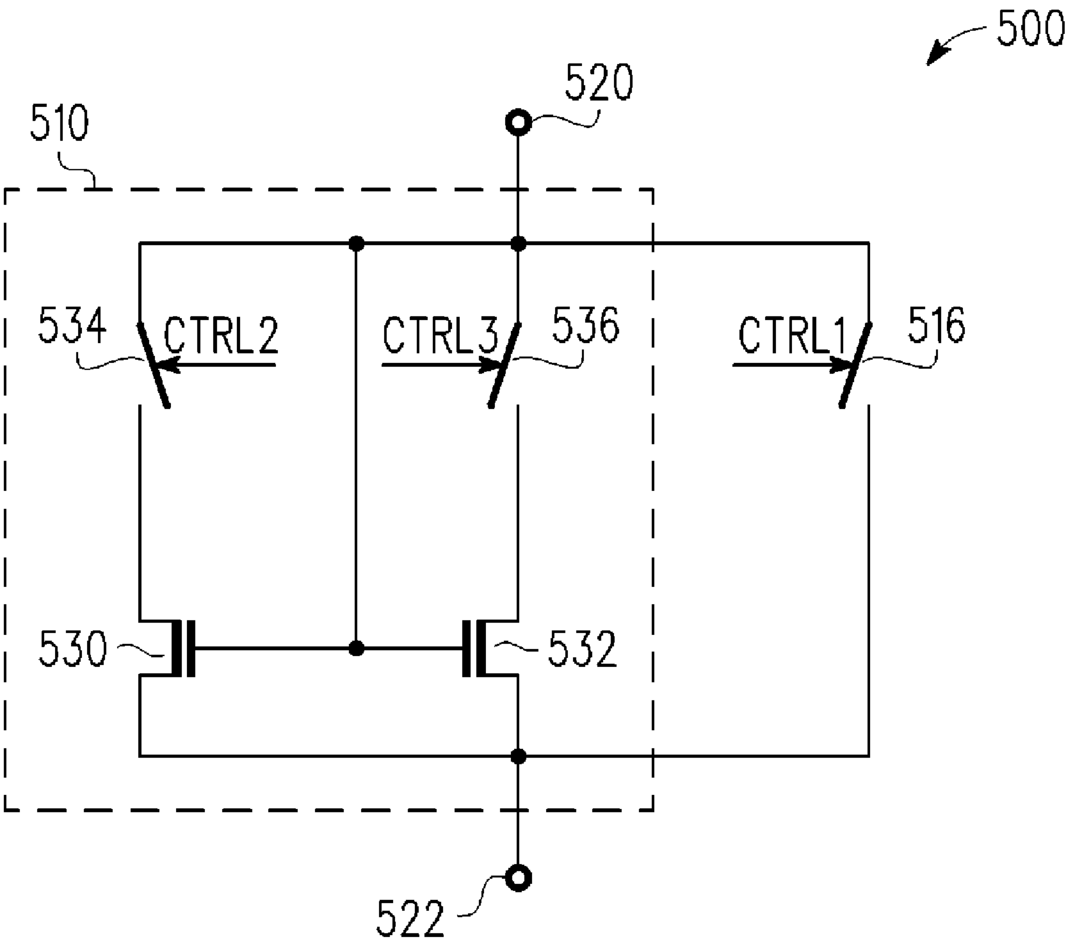
FIG. 5 illustrates a circuit diagram of another particular embodiment of a zero temperature coefficient cell of FIG. 1.

The ZTC cells illustrated at FIGS. 2-4 can be combined in different ways to provide for selectable levels of voltage drops. For example, FIG. 5 illustrates a circuit diagram an integrated circuit device 500 including a ZTC cell 510 and a switch 516. The ZTC cell 510 includes a first terminal 520, a second terminal 522, and includes n-channel transistors 530 and 532, and switches 534 and 536. The transistor 530 has a first current electrode, a second current electrode connected to the second terminal 522, and a control electrode. The transistor 532 has a first current electrode, a second current electrode coupled to the second current electrode of the transistor 530, and a control electrode connected to the control electrode of the transistor 530. The switch 534 has a first terminal connected to the first terminal 520, a second terminal connected to the first current electrode of the transistor 530, and a control input configured to receive a control signal labeled "CTRL2." The switch 536 has a first terminal connected to the first terminal of the switch 534, a second terminal connected to the first current electrode of the transistor 532, and a control input configured to receive a control signal labeled "CTRL3." The switch 516 has a first terminal connected to the first terminal of the switch 536, a second terminal connected to the second current electrode of the transistor 532, and a control input configured to receive a control signal labeled "CTRL1."

The transistors 530 and 532 are each configured similarly to the ZTC cell 412 (FIG. 4) and connected in parallel. The switches 516, 534, and 536 are configured, based on the control signals CTRL1, CTRL2, and CTRL3, are configured to control application of current from a current source (not shown) to the terminal 520, thereby controlling a voltage drop across the ZTC cell 520. Because of the configuration of the transistors 530 and 532, the voltage drop will be substantially constant over a specified range of temperatures.

For example, in one embodiment the transistors 530 and 532 are low-voltage NMOS transistors having a gate-source voltage of approximately 950 millivolts. In this embodiment, the ZTC cell 510 can generate a voltage drop, based on an applied current of 0.5 micro-amps, a voltage drop of zero volts, 0.95 volts, or 1.47 volts, depending on the states of each of the switches 516, 534, and 536. When the voltage drop is approximately 0.95 volts, the transistors 530 and 532 are configured such that the voltage drop varies less than 0.95 percent over a temperature range of −40° C. to +150° C. In another embodiment, the transistors 530 and 532 are medium-voltage NMOS transistors having a gate-source voltage of approximately 1.47 millivolts. In this embodiment, when the voltage drop across the ZTC cell is approximately 1.47 volts, the transistors 530 and 532 are configured such that the voltage drop varies less than 1.19 percent over a temperature range of −40° C. to +150° C.

Figure 6:
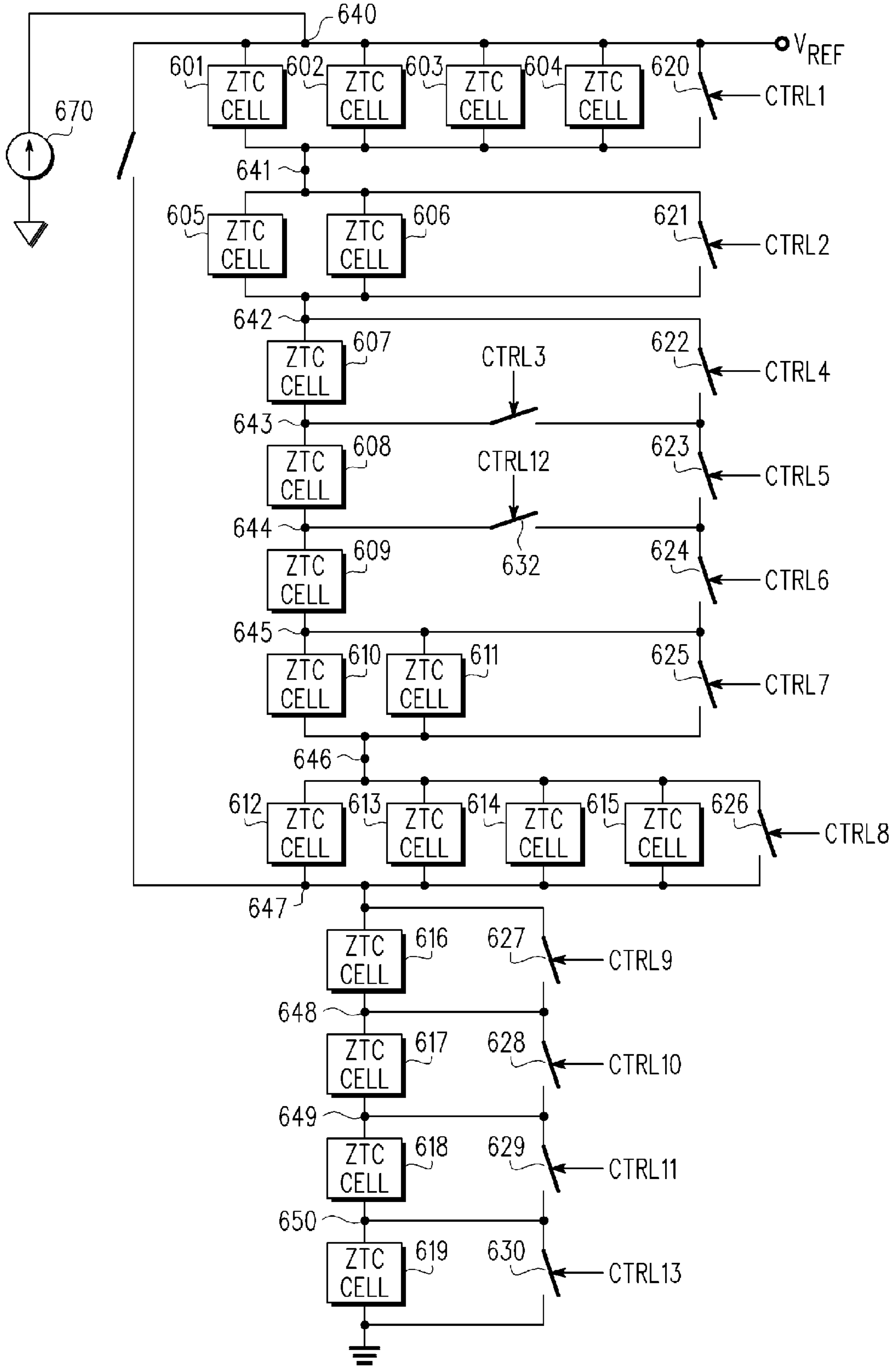
FIG. 6 illustrates a circuit diagram of a particular embodiment of a voltage reference module in accordance with one embodiment of the present disclosure.

FIG. 6 illustrates a circuit diagram schematic diagram of a voltage reference module including a current source 670, ZTC cells 601, 602, 603, 604, 605, 606, 607, 608, 609, 610, 611, 612, 613, 614, 615, 616, 617, 618, and 619 (ZTC cells 601-619), and switches 620, 621, 622, 623, 624, 625, 626, 627, 628, 629, 630, 631, and 632 (switches 620-632). The current source 670 includes a first terminal connected to a first voltage reference and a second terminal connected to a node 650. The ZTC cells 601, 602, 603, and 604 each include a first terminal connected to the node 640 and each include a second terminal connected to a node 641. The ZTC cells 605 and 606 each include a first terminal connected to the node 641 and a second terminal connected to a node 642.

The ZTC cell 607 includes a first terminal connected to the node 642 and a second terminal connected to a node 643. The ZTC cell 608 includes a first terminal connected to the node 643 and a second terminal connected to a node 644. The ZTC cell 609 includes a first terminal connected to the node 644 and a second terminal connected to a node 645. The ZTC cells 610 and 611 each include a first terminal connected to the node 645 and each include second terminal connected to a node 646. The ZTC cells 612, 613, 614, and 615 each include a first terminal connected to the node 646 and each include second terminal connected to a node 647. The ZTC cell 616 includes a first terminal connected to the node 647 and a second terminal connected to a node 648. The ZTC cell 617 includes a first terminal connected to the node 648 and a second terminal connected to a node 649. The ZTC cell 618 includes a first terminal connected to the node 649 and a second terminal connected to a node 650. The ZTC cell 619 includes a first terminal connected to the node 650 and a second terminal connected to a ground voltage reference.

The switch 620 includes a first terminal connected to the node 640, a second terminal connected to the node 641, and a control input to receive a control signal labeled CTRL1. The switch 621 includes a first terminal connected to the node 641, a second terminal connected to the node 641, and a control input to receive a control signal labeled CTRL2. The switch 622 includes a first terminal connected to the node 642, a second terminal, and a control input configured to receive a control signal labeled CTRL4. The switch 631 includes a first terminal connected to the node 643, a second terminal connected to the second terminal of the switch 622, and a control input configured to receive a control signal labeled CTRL3. The switch 623 includes a first terminal connected to the second terminal of the switch 622, a second terminal, and a control input configured to receive a control signal labeled CTRL5. The switch 632 includes a first terminal connected to the node 644, a second terminal connected to the second terminal of the switch 623, and a control input configured to receive a control signal labeled CTRL12.

The switch 624 includes a first terminal connected to the second terminal of the switch 632, a second terminal connected to the node 645, and a control input to receive a control signal labeled CTRL5. The switch 625 includes a first terminal connected to the node 645, a second terminal connected to the node 646, and a control input to receive a control signal labeled CTRL6. The switch 625 includes a first terminal connected to the node 645, a second terminal connected to the node 646, and a control input to receive a control signal labeled CTRL7. The switch 626 includes a first terminal connected to the node 646, a second terminal connected to the node 647, and a control input to receive a control signal labeled CTRL8. The switch 627 includes a first terminal connected to the node 647, a second terminal connected to the node 648, and a control input to receive a control signal labeled CTRL9. The switch 628 includes a first terminal connected to the node 648, a second terminal connected to the node 649, and a control input to receive a control signal labeled CTRL10. The switch 629 includes a first terminal connected to the node 649, a second terminal connected to the node 650, and a control input to receive a control signal labeled CTRL11. The switch 630 includes a first terminal connected to the node 650, a second terminal connected to ground voltage reference, and a control input to receive a control signal labeled CTRL13.

In operation, the switches 620-632 can be individually controlled by the control signal associated with each respective switch in order to control a voltage, labeled $V_{REF}$, provided at node 640. In particular, the state of the switches 620-632 control application of a current provided by the current source 670 to the ZTC cells 601-619, thereby controlling the level of voltage drops across the nodes connected to each of the switches 620-632. The voltage $V_{REF}$ is equal to the sum of these voltage drops.

Each of the ZTC cells 601-619 can correspond to one of the ZTC cells illustrated at FIGS. 2-5. For example, in one embodiment the ZTC cells 601-615 are each configured similarly to ZTC cell 210 (FIG. 2), while the ZTC cells 616-619 are each configured similarly to ZTC cell 510 (FIG. 5). In this embodiment, the ZTC cells 616-619 can each receive additional control signals (not shown) to control switches incorporated in the cells, thereby providing further control of the voltage $V_{REF}$. In an embodiment, the current applied by the current source 670 is approximately 100 nano-amps, and the voltage $V_{REF}$ can be set, based on the control signals CTRL1 through CTRL12, to a magnitude between 0.48 volts to 6.3 volts in 28 millivolt steps.

Figure 7:
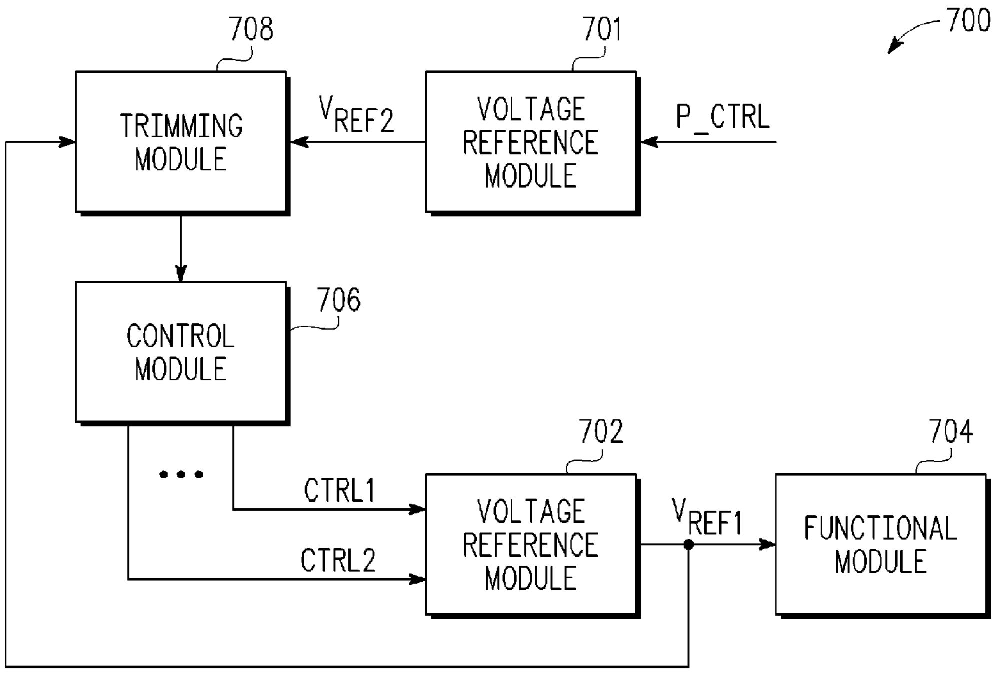
FIG. 7 illustrates a block diagram of an integrated circuit device in accordance with another embodiment of the present disclosure.

FIG. 7 illustrates a block diagram of an integrated circuit device 700 in accordance with one embodiment of the present disclosure. The integrated circuit device includes a voltage reference 701, a voltage reference module 702, a functional module 704, a control module 706, and a trimming module 708. The voltage reference 701 has an input configured to receive a control signal, labeled P_CTRL, and an output configured to provide a voltage labeled $V_{REF2}$. The trimming module 708 has an input configured to receive a voltage labeled $V_{REF1}$, an input configured to receive the voltage $V_{REF2}$ and an output. The control module 706 has an input connected to the output of the trimming module 708, and a number of outputs to provide control signals, including first and second outputs to provide control signals labeled CTRL1 and CTRL2 respectively. The voltage reference module 702 has a number of inputs to receive control signals from the control module 706, including a first input configured to receive the control signal CTRL1, an input configured to receive the control signal CTRL2, and an output to provide the voltage $V_{REF1}$. The functional module 704 has an input configured to receive the voltage $V_{REF1}$.

The voltage reference module 701 is configured, in a normal or active power state, to provide a specified known voltage $V_{REF2}$. For example, in one embodiment the voltage reference module is a bandgap voltage reference that provides a stable, known voltage. In addition, the voltage reference module 701 is configured to be placed in a low-power state based on the control signal P_CTRL. In the low-power state, the voltage $V_{REF2}$ is reduced to a level below the known voltage, thereby reducing the power consumption of the voltage reference module 701.

The voltage reference module 702, the functional module 704, and the control module 706 are each configured similarly to the corresponding items of FIG. 1. The trimming module 708 is configured to store trimming information to set the control signals CTRL1 and CTRL2, and thereby control the voltage $V_{REF1}$ in similar fashion described with respect to FIG. 1. In addition, the trimming module 708 is configured to adjust the stored trimming information based on the voltage $V_{REF2}$.

In particular, during a trimming process of the integrated circuit device 700, the voltage reference module 701 is placed in the normal state so that the voltage $V_{REF2}$ is set to the specified known voltage. The trimming module 708 sets the stored trimming information such that switches at the voltage reference module are set to an initial state, thereby also setting the voltage $V_{REF1}$ to an initial voltage. The trimming module 708 compares the voltages $V_{REF1}$ and $V_{REF2}$ and, if the voltages do not match within a specified tolerance, adjusts the stored trimming information. This in turn adjusts the switches at the voltage reference module 702 to modify the voltage drops across the ZTC cells and thereby adjust the voltage $V_{REF1}$. The trimming module 708 continues to adjust the stored trimming information until the voltage $V_{REF1}$ matches the voltage $V_{REF2}$ within a specified tolerance. The trimming module then stops comparison of the voltages and adjustment of the stored trimming information.

In response to the voltage $V_{REF1}$ matching the voltage $V_{REF2}$ within the specified tolerance, the control signal P_CTRL places the voltage reference module into the low-power state, thereby reducing the voltage $V_{REF2}$ and the power consumed by the voltage reference module. Accordingly, in the illustrated embodiment of FIG. 7, the integrated circuit 700 employs the relatively high-power voltage reference module 701 to generate a known voltage $V_{REF2}$, and then trims the relatively low-power voltage reference module 702 to set the voltage $V_{REF1}$ to a matching voltage level. The integrated circuit 700 then places the voltage reference module 701 in a low-power state. The illustrated embodiment therefore allows for setting a reference voltage level based on a known voltage while reducing power consumption.

Figure 8:
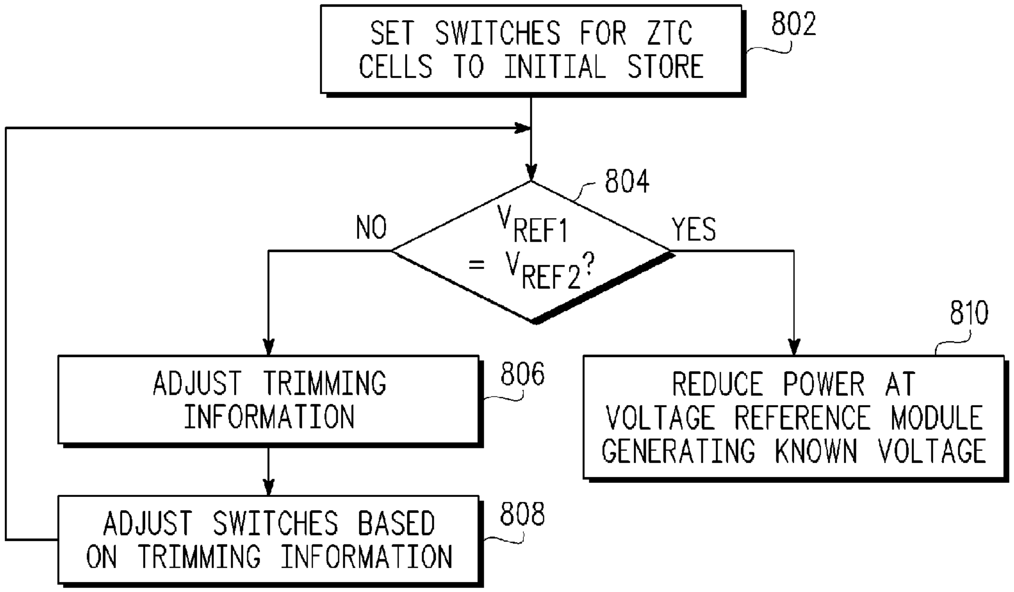
FIG. 8 illustrates a flow diagram of a method of trimming a voltage at an integrated circuit device in accordance with one embodiment of the present disclosure.

FIG. 8 illustrates a flow diagram of a method of trimming an integrated circuit device in accordance with one embodiment of the present disclosure. At block 802, the trimming module 708 provides trimming information to the control module 706 to set switches associated with ZTC cells of the voltage reference module 702 to an initial state. In one embodiment, the initial state corresponds to an open state for all switches, such that current is applied to each ZTC cell, resulting in the voltage $V_{REF1}$ being placed at a specified maximum. In another embodiment, the initial state corresponds to a closed state for all switches, such that current is not applied to any of the ZTC cells, resulting in the voltage $V_{REF}$ being set to a specified minimum.

At block 804, it is determined whether $V_{REF1}$ matches $V_{REF2}$. As used herein, a first voltage matches a second voltage if the first and second voltages differ by less than a specified tolerance. If $V_{REF1}$ does not match $V_{REF2}$, the method flow proceeds the block 806 and the trimming information at the trimming module 806 is adjusted to change the voltage $V_{REF1}$. The method of adjustment depends on how the trimming information is stored. For example, the trimming information can be stored in a set of fuses, and the information adjusted by programming (e.g. blowing) one or more of the fuses. In another embodiment, the trimming information can be stored in a set of non-volatile memory cells, and the trimming information adjusted by programming one or more of the cells. In still another embodiment, the trimming information can be stored at a register, and the information adjusted by changing a value stored at the register.

At block 808, one or more switches associated with one or more ZTC cells at the voltage reference module 702 are adjusted based on the adjusted trimming information. In an embodiment, the trimming information is adjusted to change one or more of the switches from an open state to a closed state, thereby halting application current to the ZTC cells associated with the selected switches and reducing the voltage $V_{REF1}$. In another embodiment, the trimming information is adjusted to change one or more of the switches from a closed state to an open state, thereby causing application of the current to the ZTC cells associated with the selected switches and increasing the voltage $V_{REF1}$. In still another embodiment, the trimming information is adjusted such that the state of a single switch, associated with a single ZTC cell or set of ZTC cells, is changed, so that the voltage $V_{REF1}$ is adjusted in a stepwise fashion. After adjustment of one or more switches at the voltage reference module 702, the method flow returns to block 804 and the trimming module 708 compares the adjusted $V_{REF1}$ to the voltage $V_{REF2}$.

If, at block 804, the trimming module 708 determines that $V_{REF1}$ matches $V_{REF2}$, the method flow proceeds to block 810 and power at the voltage reference module 701 is reduced. For example, the voltage reference module 701 can be placed in a low power state, thereby reducing the voltage $V_{REF2}$ and reducing power consumption at the integrated circuit device 700. In addition, one or more fuse elements can be programmed in order to fix the switches associated with the voltage reference module 702 in their current state, so that the voltage $V_{REF1}$ is maintained at the set level.

In one embodiment, the trimming method illustrated at FIG. 8 is performed during a testing or qualification process of the integrated circuit device 700. In this embodiment, the stored trimming information at the trimming module 708 remains fixed in response to a power-on reset event and during normal operation of the integrated circuit device 700. In another embodiment, the trimming method illustrated at FIG. 8 is performed in response to a power-on reset event at the integrated circuit device 700. This allows the voltage $V_{REF1}$ to be adjusted based on changes to performance of ZTC cells due to device operating conditions. In still another embodiment, the trimming method of FIG. 8 is performed in response to a user-request during operation of the integrated circuit device 100.

Figure 9:
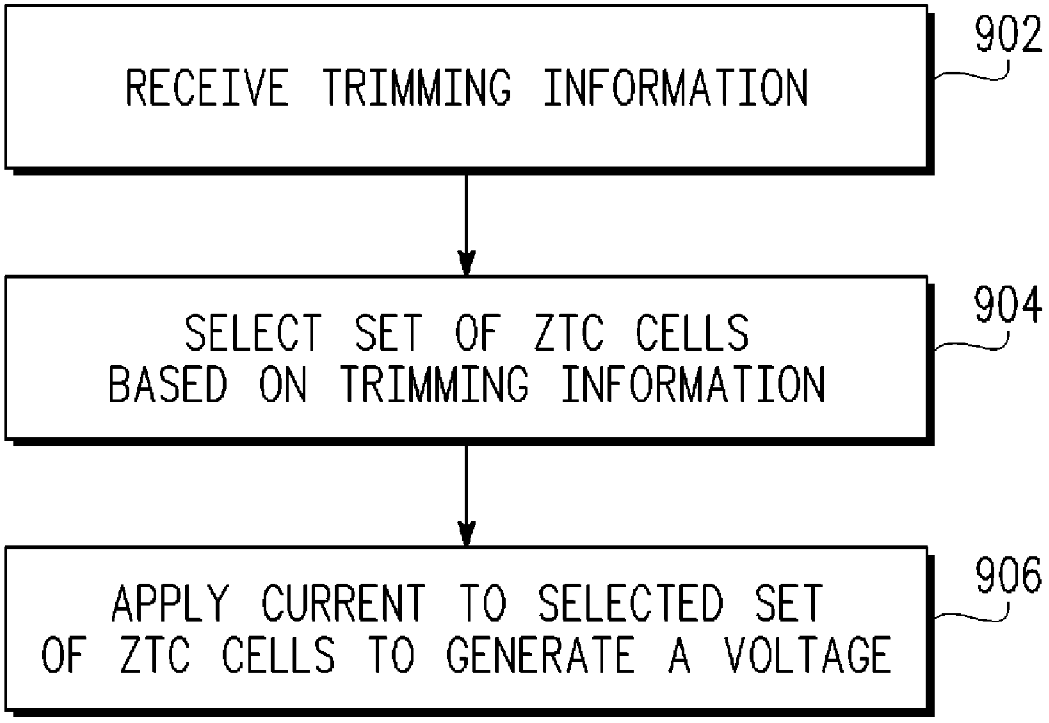
FIG. 9 illustrates a flow diagram of a method of generating a trimmed voltage at an integrated circuit device in accordance with one embodiment of the present disclosure.

Referring to FIG. 9, a flow diagram of a particular embodiment of a method of setting a reference voltage level at an integrated circuit device is illustrated. At block 902, the control module 706 receives trimming information from the trimming module 708. In an embodiment, the trimming information has previously been configured according to the method illustrated at FIG. 8. Based on the trimming information, at block 904 the control module 706 selects a set of ZTC cells at the voltage reference module 702. In an embodiment, the selected set of ZTC cells represents a subset of available ZTC cells at the voltage reference module 702. At block 906, the control module 706 sets the control signals associated with the selected set of ZTC cells to set the associated switches so that current is applied to each ZTC cell in the selected set. This sets the voltage $V_{REF1}$ to a specified level based upon the stored trimming information.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:

selecting a subset of zero temperature coefficient (ZTC) cells from a plurality of ZTC cells, each of the plurality of ZTC cells configured to provide a substantially constant voltage drop over a temperature range in response to application of a current; and applying the current to the subset of ZTC cells to generate a reference voltage for an integrated circuit device.

2. The method of claim 1, wherein the temperature range is a range of −40 degrees Celsius to +150 degrees Celsius.

3. The method of claim 1, wherein a voltage drop over one of the first subset of ZTC cells varies less than 15 percent over the temperature range.

4. The method of claim 1, wherein a voltage drop over one of the first subset of ZTC cells varies less than 5 percent over the temperature range.

5. The method of claim 1, where selecting the subset of ZTC cells comprises programming a plurality of switches based on stored trimming information.

6. The method of claim 1, wherein the plurality of ZTC cells comprises a first ZTC cell and a second ZTC cell, and wherein selecting the subset of ZTC cells comprises:

selecting the first ZTC cell;

applying the current to the first ZTC cell in response to selecting the first ZTC cell;

determining if a first voltage generated by the plurality of ZTC cells exceeds a threshold in response to applying the current to the first ZTC cell; and selecting the second ZTC cell in response to determining that the first voltage does not exceed the threshold.

7. The method of claim 6, wherein determining if the first voltage exceeds the threshold comprises determining if the first voltage exceeds the threshold in response to a power-on reset event at the integrated circuit device.

8. The method of claim 7, wherein the threshold comprises a second voltage generated by a voltage reference module.

9. The method of claim 8, wherein the voltage reference module comprises a bandgap voltage reference.

10. The method of claim 8, further comprising reducing the second voltage in response to determining the first voltage exceeds the threshold.

11. The method of claim 1, wherein the plurality of ZTC cells comprises a first ZTC cell and a second ZTC cell, and wherein selecting the subset of ZTC cells comprises:

applying the current to the first ZTC cell and the second ZTC cell;

determining if a first voltage generated by the plurality of ZTC cells exceeds a threshold in response to applying the current to the first ZTC cell; and halting application of the current to the second ZTC cell in response to determining the first voltage exceeds the threshold.

12. The method of claim 1 wherein one of the first plurality of ZTC cells comprises:

a first resistor having a first terminal and a second terminal, the first resistor having a positive temperature coefficient; and a second resistor having a first terminal connected to the second terminal of the first resistor, and a second terminal, the second resistor having a negative temperature coefficient.

13. The method of claim 1 wherein one of the plurality of ZTC cells comprises a transistor comprising a first current electrode, a second current electrode, and a control electrode coupled to the first current electrode.

14. The method of claim 1, wherein:

a first ZTC cell of the plurality of ZTC cells comprises:

a first resistor having a first terminal and a second terminal, the first resistor having a positive temperature coefficient; and a second resistor having a first terminal connected to the second terminal of the first resistor, the second resistor having a negative temperature coefficient; and a second ZTC cell of the plurality of ZTC cells comprises a transistor comprising a first current electrode, a second current electrode, and a control electrode coupled to the first current electrode.

15. A method, comprising:

applying a current to a first zero temperature coefficient (ZTC) cell of a plurality of ZTC cells to generate a first voltage, each of the plurality of ZTC cells configured to provide a substantially constant voltage drop over a temperature range in response to application of the current;

altering application of the current to a second ZTC cell of the plurality of ZTC cells in response to determining that the first voltage does not match a second voltage within a tolerance; and generating a reference voltage for an integrated circuit device in response to application of the current to the plurality of ZTC cells.

16. The method of claim 15, wherein altering application of the current comprises applying the current to the second ZTC cell.

17. The method of claim 15, wherein altering application of the current comprises halting application of the current to the second ZTC cell.

18. A device comprising:

an output configured to provide a reference voltage for a functional module of an integrated circuit device;

a current source comprising an output configured to provide a current;

a first zero temperature coefficient (ZTC) cell having a first terminal coupled to the output, and a second terminal, the first ZTC cell configured to provide a first substantially constant voltage drop over a temperature range;

a first switch having a first terminal connected to the first terminal of the first ZTC cell, a second terminal connected to the second terminal of the first ZTC cell, and a control input configured to receive a first control signal, the first switch configured to be placed in an open or closed state based on the first control signal;

a second ZTC cell having a first terminal coupled to the second terminal of the first ZTC cell, and a second terminal coupled to a voltage reference, the second ZTC cell configured to provide a second substantially constant voltage drop over the temperature range; and a second switch having a first terminal connected to the first terminal of the second ZTC cell, a second terminal connected to the second terminal of the second ZTC cell, and a control input configured to receive a second control signal, the second switch configured to be placed in an open or closed state based on the second control signal.

19. The device of claim 18 wherein one of the first zero temperature coefficient cell and the second zero temperature coefficient cell comprises:

a first resistor comprising a first terminal and a second terminal, the first resistor having a positive temperature coefficient; and a second resistor comprising a first terminal connected to the second terminal of the first resistor, and a second terminal, the second resistor having a negative temperature coefficient.

20. The device of claim 18 wherein one of the first ZTC cell and the second ZTC cell comprises:

a transistor having a first current electrode coupled to the first terminal of the one of the first zero temperature coefficient cell and the second zero temperature coefficient cell, a second current electrode coupled to the second terminal of the one of the first zero temperature coefficient cell and the second zero temperature coefficient cell, and a control electrode connected to the first current electrode.

* * * * *